(No Model.)
J. W. McCOY.
CLUTCH CLAMP.
No. 368,408. Patented Aug. 16, 1887.
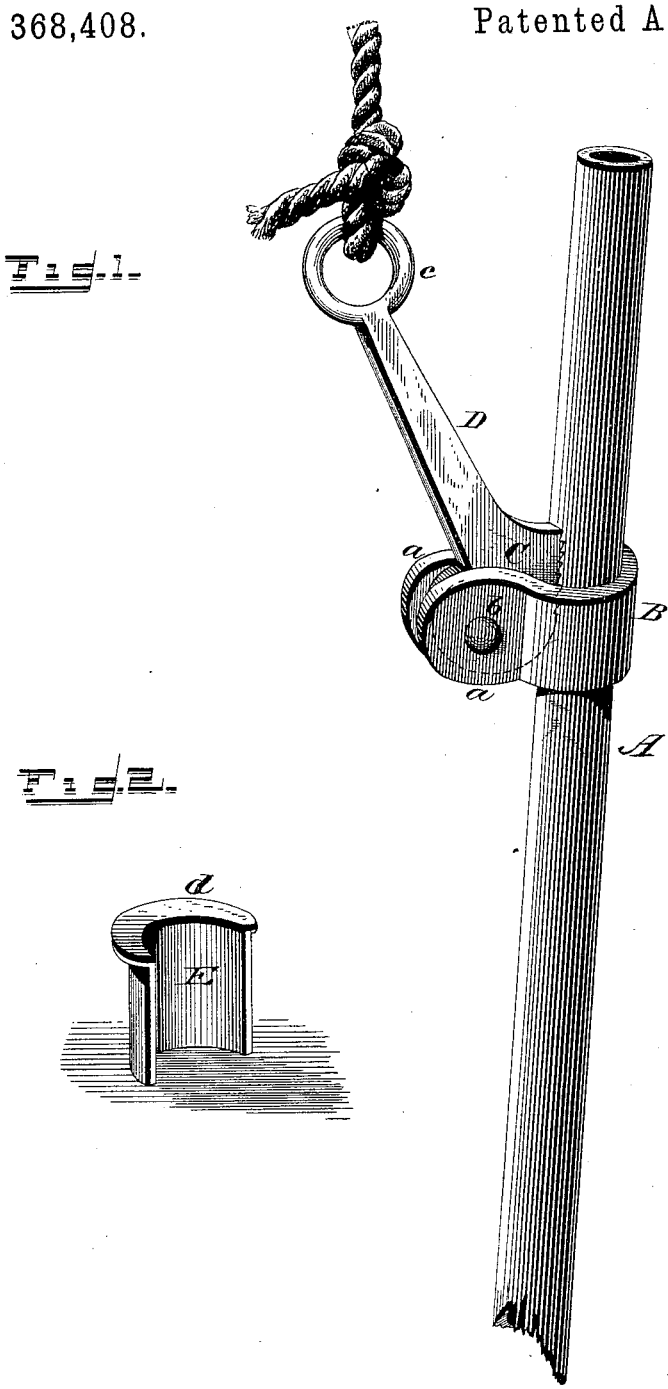
Witnesses
G. S. Elliott.
L. L. Miller.
Inventor
John W. McCoy,
By his Attorney
Chas. V. Fowler

UNITED STATES PATENT OFFICE.

JOHN WILLIAM McCOY, OF SAN ANGELO, TEXAS.

CLUTCH-CLAMP.

SPECIFICATION forming part of Letters Patent No. 368,408, dated August 16, 1887.

Application filed April 4, 1887. Serial No. 233,691. (No model.)

*To all whom it may concern:*

Be it known that I, JOHN WILLIAM McCOY, a citizen of the United States, residing at San Angelo, in the county of Tom Green and State of Texas, have invented certain new and useful Improvements in Clutch-Clamps; and I do hereby declare that the following is a full, clear, and exact description of the same, reference being had to the annexed drawings, making a part of this specification, and to the letters and figures of reference marked thereon.

Figure 1 of the drawings is a perspective view of my improved clutch-clamp, showing it connected to a section of metal pipe while in the act of lowering it; and Fig. 2 a perspective view on a somewhat enlarged scale of the semicircular sleeve used in connection therewith when applying the clamp to pipes of smaller diameter.

The object of the present invention is to provide a simple and effective device for lowering or hoisting the pipe or rods of pumps into bored wells or other places, such as mines or shafts, and without injury to the pipe or rod, such device further being not only readily and easily handled in connecting it to or disconnecting it from the object to be raised or lowered, but capable of being manufactured at comparatively small cost.

The above objects I attain by the construction substantially as shown in the drawings, and hereinafter described and claimed.

In the accompanying drawings, A represents a section of metal pipe or tubing usually employed in driven wells and which it is found necessary to raise or lower the required depth. The clutch-clamp consists of the yoke B, the ends of which are bent to form bearings for a pin, b, which passes through it, said pin also passing eccentrically through a clamp, C, to form a journal for the clamp, the bearings, as shown at a, also forming guides for the clamp between which it works.

The clamp C is provided with serrations or teeth upon its face for securely gripping the pipe or tubing, and has a lever, D, extending at an angle therefrom, as shown, and terminates in a ring, c, or other equivalent means for attaching thereto one end of a lowering or hoisting rope.

By means of this simple device a great weight of pipe may be supported thereby, and lowered in wells or shafts several hundred feet in depth without danger of slipping or becoming disconnected from the object being lowered or raised. As each additional section of pipe or tubing is securely screwed into coupling, the device is slipped up or down, as may be desired.

In order to adapt the device to pipe or tubing of reduced diameter I provide a semicircular sleeve, E, having at one end an outwardly-extending flange, d, which extends over and rests upon the upper edge of the yoke B to retain it in place, and by its use the interior diameter of the yoke is sufficiently reduced to enable the clamp to bear with sufficient friction against the pipe or tubing to hold the device thereto without danger of its slipping thereon.

The device as above described may be employed for raising or lowering any objects for whatever purpose so long as said device is capable of being connected thereto, and may be made of varying sizes to adapt them to special uses.

It will be observed that the serrations on the clamp C are not on the arc of a circle, as is common in this class of devices, but the clamp at this part has an extended straight portion on which the serrations or teeth are formed. This provides a better hold on the article being clamped, and relieves in a measure the strain on the pin b. The ring c is formed integral with the lever, so that when force is applied to the rope attached thereto the clamp is forced firmly against the pipe and all danger of slipping is avoided, and by the peculiar form of the clamp the pipe will not slip even if the rope should become slack. The device is simple, durable, and not likely to break or to get out of order.

Having now fully described my invention, what I claim as new, and desire to secure by Letters Patent, is—

The herein-described device for handling metal pipes, tubes, and analogous articles, consisting of the yoke B, comprising in a single element a substantially-cylindrical portion to embrace the pipe and parallel lugs a, and the clamp-lever eccentrically pivoted to and between said lugs, and comprising in a single element the clamp C, having serrated extended straight portion, a lever, D, and a ring, c, and the whole adapted to serve substantially as and for the purpose specified.

In testimony that I claim the above I have hereunto subscribed my name in the presence of two witnesses.

JOHN WILLIAM McCOY.

Witnesses:
W. G. BARTLETT,
J. M. PHILIPS.